(No Model.)
W. A. BOULTER.
RECEPTACLE FOR CANS OF CONDENSED MILK.
No. 489,923. Patented Jan. 17, 1893.
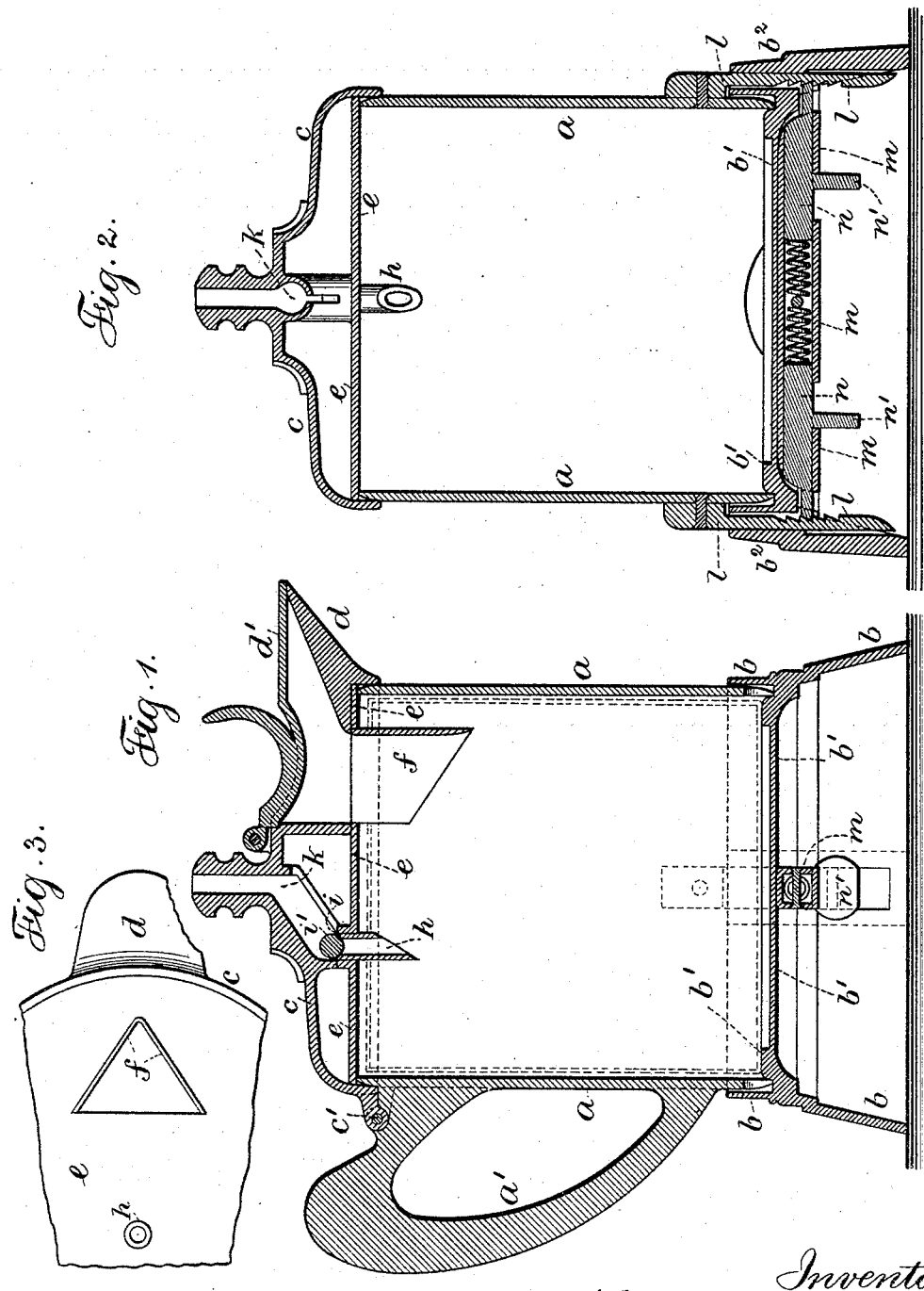
Witnesses:
J. Staib
Chas. H. Smith
Inventor:
William A. Boulter
per Lemuel W. Serrell
Atty

UNITED STATES PATENT OFFICE.

WILLIAM A. BOULTER, OF BROOKLYN, ASSIGNOR TO HIMSELF, AND AUGUST R. KOLB, OF NEW YORK, N. Y.

RECEPTACLE FOR CANS OF CONDENSED MILK.

SPECIFICATION forming part of Letters Patent No. 489,923, dated January 17, 1893.

Application filed April 21, 1892. Serial No. 429,995. (No model.)

*To all whom it may concern:*

Be it known that I, WILLIAM A. BOULTER, a citizen of the United States, residing at Brooklyn, in the county of Kings and State of New York, have invented a new and useful Improvements in Receptacles for Cans of Condensed Milk, of which the following is a specification.

My invention relates to a receptacle or device for table use for holding a can of condensed milk and for providing an opening in the top thereof, so that the contents of the can may be employed in the usual manner.

Receptacles have heretofore been employed for cans of condensed milk, but the top of the can was partially removed so that the contents could be taken out by a spoon or similar article. These receptacles simply served as an ornamental holder to the can.

The object of my invention is to provide a receptacle or holder for a can of condensed milk or other material which shall not only conceal and cover the can and present an acceptable appearance for table use, and to provide devices preferably connected to said receptacle for the delivery of the condensed milk and for the entrance of air to displace the milk removed, the devices excluding as much air as possible when not in use so that the milk will not be subject to evaporation.

In carrying out my invention I employ a cylindrical holder having a handle and a base thereto which is preferably removable and a hinged top or cover having a covered spout and air vent, and I provide perforations connected to said top or cover for puncturing the can of condensed milk, for the delivery of the milk and for the entrance of air to the can. These devices I prefer to consist of an inclined V shaped cutting blade, the upper end of which is adjacent to the spout of the cover and by which the milk is delivered after the top of the can is cut through, and a cutter tube for puncturing the top of the can for the inlet of air.

In the drawings Figures 1 and 2 are vertical sections of my improved device at right angles to each other and Fig. 3 is an inverted plan of part of the hinged top or cover.

$a$ represents the cylindrical holder to which the lifting handle $a'$ is connected, and $b$ $b'$ represent the parts composing a base connected to the cylindrical holder $a$ and which is preferably removable. The top or cover $c$ is hinged at $c'$ to the handle $a'$. Within the holder the condensed milk can shown by dotted lines is to be placed where it is out of sight and the holder is to be made of any desired ornamental and pleasing form for table use. The hinged top or cover $c$ which is the essential feature of my invention is made with a pouring lip $d$ to which a hinged cover $d'$ is applied, and usually there is an inner plate $e$ soldered at its edges to the cover or formed with the same, and to the edges of openings formed in said plate I secure an inclined V shaped cutting blade $f$ and a cutter tube $h$ which are permanently fastened in place. The top edge of the blade $f$ is adjacent to the edge of the pouring spout and the office of the blade $f$ is to puncture the top of the milk can as the cover is pressed and shut down and to cut therein diverging slits that leave a tongue that is pressed down into the can. The metal of the can frictionally grips the blade $f$, and said blade becomes part of the operative spout in delivering the contents of the condensed milk can when the receptacle is tilted in use. An uninterrupted way is thus provided for the delivery of the condensed milk and for the return of the surplus. The cutter tube $h$ has a seat $i$ above the plate $e$ for a ball $i'$ and the air tube $k$ comprises said seat and extends above and through the hinger cover $c$. The ball upon the seat $i$ closes the tube $h$ when the can receptacle is in a normal or vertical position and when the receptacle is tilted the ball rolls forward and uncovers the tube $h$ to admit air. The cutter tube $h$ punctures the top of the can of milk in the same manner as the cutter blade $f$, and air enters by the tubes $k$ $h$ and passes into the can as the condensed milk is delivered therefrom. The hinged cover $d'$ and the ball $i'$ effectually close the can of milk to atmospheric influences and lessen the risk of evaporation or of injury to the milk.

The removable base is composed of a circular rim $b$ and plate $b'$ upon which the cylindrical holder $a$ rests, and upon this base are metal sockets $b^2$ and notched rods $l$ secured to the cylindrical portion $a$ pass through the said sockets $b^2$.

Upon the under side of the plate $b'$ are slide ways $m$ for the spring actuated catches $n$ whose pointed ends engage the notches of the rods $l$ in holding the cylindrical portion $a$ and base together. Finger pieces $n'$ upon catches $n$ extend through mortises in the slide ways $m$ for operating the catches.

I do not limit myself to the use of the removable base, as said base might be directly connected with the cylindrical holder $a$ or dispensed with and the devices of the cover be employed with a cylindrical portion and bottom plate and the can of condensed milk be inserted by lifting said cover as well as by the separation of the cylindrical holder and base.

The cover and devices connected therewith for opening the can of milk could be employed alone with its circumscribing flange or rim fitting over the can.

I claim as my invention.

1. The combination with a cylindrical holder adapted to contain a can of condensed milk or similar material, of a hinged cover having a pouring lip, and an inclined V shaped cutting blade connected to the cover contiguous to the pouring lip, substantially as and for the purposes set forth.

2. The combination with a cylindrical holder adapted to contain a can of condensed milk, of a hinged cover having a pouring lip and cover thereto, an inclined V shaped cutting blade connected to the cover contiguous to the pouring lip, and an air tube through the cover having a cutting edge below the cover and a valve, substantially as and for the purposes set forth.

3. The combination with the cylindrical holder $a$, a handle thereto and a base, of a hinged top or cover $c$, a pouring lip $d$ and cover $d'$, the plate $e$ and the inclined V shaped cutting blade $f$ secured at the edges of an opening in said plate $e$ and being contiguous to the pouring lip for puncturing the top of the can and delivering the contents, substantially as set forth.

4. The combination with the cylindrical holder $a$, a handle thereto and a base, of a hinged top or cover $c$, a pouring lip $d$ and cover $d'$, the plate $e$, inclined V shaped cutting blade $f$, the cutter tube $h$ and valve $i'$ and the air tube $k$, substantially as set forth.

5. The combination with the cylindrical holder $a$, the hinged top or cover $c$ having a pouring lip and the inclined V shaped cutting blade $f$, of the removable base composed of a flange $b$ and plate $b'$ and sockets $b^2$, the notched rods $l$, the slide ways $m$ and spring actuated catches $n$, substantially as and for the purposes set forth.

6. The combination with a cylindrical holder adapted to contain a can of condensed milk or similar material, of a cover hinged to the holder and having a pouring lip, an inclined cutting blade in line with the pouring lip to make an incision in the can for the delivery of its contents by the pouring lip, substantially as specified.

Signed by me this 11th day of April, A. D. 1892.

WILLIAM A. BOULTER.

Witnesses:
GEO. T. PINCKNEY,
HAROLD SERRELL.